J. H. LEWIS.
GRAIN-DRILL TEETH.
No. 183,947.              Patented Oct. 31, 1876.
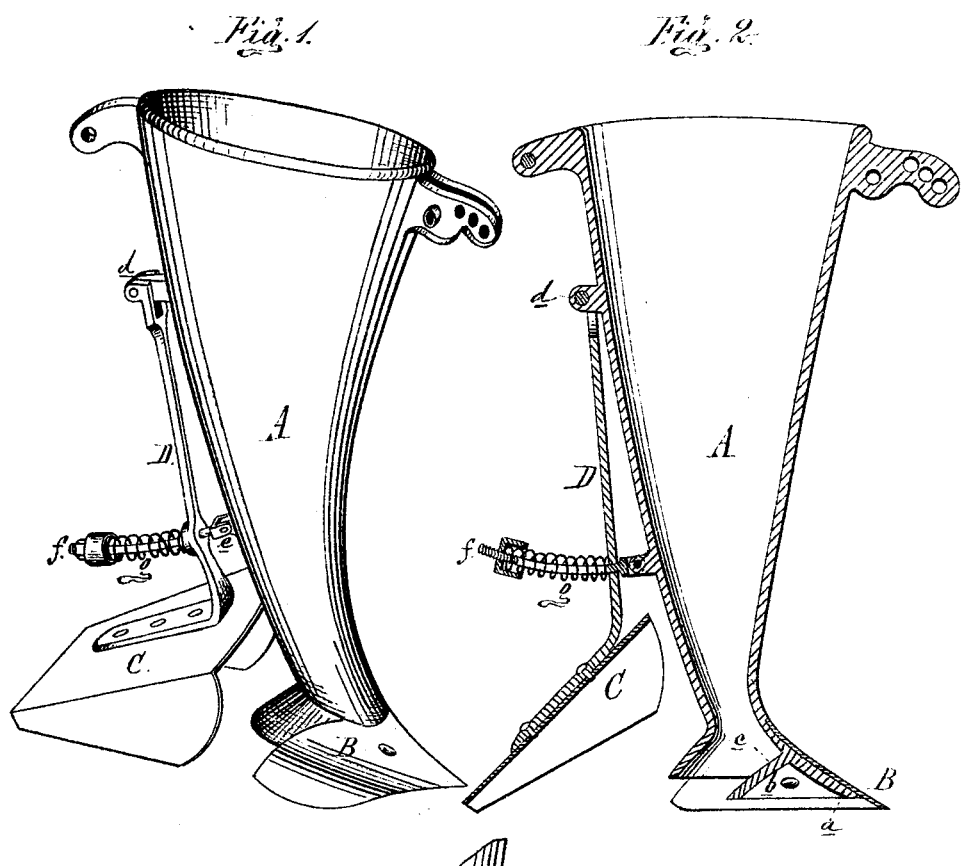
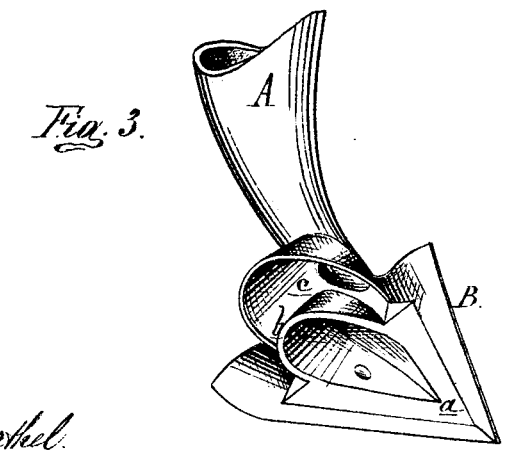

UNITED STATES PATENT OFFICE.

JAMES H. LEWIS, OF DETROIT, MICHIGAN.

IMPROVEMENT IN GRAIN-DRILL TEETH.

Specification forming part of Letters Patent No. 183,947, dated October 31, 1876; application filed September 5, 1876.

*To all whom it may concern:*

Be it known that I, JAMES H. LEWIS, of Detroit, in the county of Wayne and State of Michigan, have invented an Improved Grain-Drill Tooth, of which the following is a specification:

The first part of my invention relates to a device cast in the bottom end of the tooth for spreading the seed as it issues from the spout; and consists in a semi-conical apron cast upon or with the foot of the tooth as a rearward extension of its point.

The second part of my invention relates to an improved means of hanging the furrow-closing plate at the rear of the tooth, to which I do not attach it rigidly, as heretofore, but hang it so that it will yield when drawn over stones or other solid obstructions.

Figure 1 is a perspective view. Fig. 2 is a vertical section. Fig. 3 is a rear perspective view of the spreader and lower end of the drill-tooth.

In the drawing, A represents a drill-tooth, cast with a pointed foot, $a$, to which is secured the usual furrow-opener B. The rear end of the point $a$, instead of forming one of the sides of a triangle, as heretofore, is extended to the rear in the form of a vertically-divided cone, $b$, extending up into the flaring mouth $c$ of the tooth, so that the seed in falling upon it will be spread out broadcast in the furrow. Sown in this manner the seed has ample room to germinate, and is less liable to choke in its growth, thereby yielding a better crop.

C is a flanged covering-plate, heretofore rigidly secured to the back of the tooth, for covering back the upturned soil into the furrow. In running over stones, hard clods, lumps of sod, and other like obstructions, it was liable to be broken off. To overcome this objection I rivet it to a malleable-iron strap, D, bent as shown, and forked at the upper end, which embraces and is pivoted to a lug, $d$, cast on the back of the tooth. To a lower lug, $e$, is pivoted a rod, $f$, which passes through an eye in the strap, and between which and a nut on the outer end of said rod a spring, $g$, is coiled thereon, which will only allow the covering-plate to yield to an obstruction offering greater resistance than the soil of the furrow-trench.

I do not claim, broadly, the invention of a seed-spreader placed in the lower end of a grain-drill tooth, for the same is shown in the patent of Mansfield of August 28, 1860; but

What I claim as my invention is—

1. A grain-drill tooth, A, having the semi-conical spreader $b$, cast as a rearward extension of its point $a$, substantially as described.

2. The combination, with a grain-drill tooth, of the yielding covering-plate C, the hinged strap D, and the spring $g$ on the back of such tooth, substantially as described and shown.

JAMES H. LEWIS.

Witnesses:
 H. F. EBERTS,
 C. R. HULETT.